(12) United States Patent
Numnual et al.

(10) Patent No.: US 8,047,733 B2
(45) Date of Patent: Nov. 1, 2011

(54) BLADE DRIVE DEVICE

(75) Inventors: Phichet Numnual, Pathumthani (TH); Takashi Nakano, Chiba (JP); Prapas Charoensilputthakun, Pathumthani (TH); Noppadol Ngernping, Pathumthani (TH)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/620,767

(22) Filed: Nov. 18, 2009

(65) Prior Publication Data

US 2010/0074612 A1 Mar. 25, 2010

Related U.S. Application Data

(63) Continuation of application No. PCT/JP2009/052465, filed on Feb. 16, 2009.

(30) Foreign Application Priority Data

Apr. 11, 2008 (JP) .................................. 2008-103845

(51) Int. Cl.
*G03B 9/10* (2006.01)
(52) U.S. Cl. ........................................ 396/493; 396/497
(58) Field of Classification Search .................. 396/488, 396/493, 497
See application file for complete search history.

(56) References Cited

U.S. PATENT DOCUMENTS

| | | | | |
|---|---|---|---|---|
| 6,655,859 B2 * | 12/2003 | Kamata | ........................... | 396/449 |
| 7,798,730 B2 * | 9/2010 | Westerweck | .................. | 396/493 |
| 7,806,606 B2 * | 10/2010 | Westerweck | .................. | 396/493 |
| 2005/0086672 A1 * | 4/2005 | Shimozaki | ..................... | 720/619 |
| 2006/0250705 A1 * | 11/2006 | Numnual et al. | ............. | 359/738 |
| 2007/0183059 A1 * | 8/2007 | Miyaji | ........................... | 359/699 |
| 2009/0116832 A1 * | 5/2009 | Azuma et al. | .................. | 396/510 |

FOREIGN PATENT DOCUMENTS

| | | | |
|---|---|---|---|
| JP | 2005-352153 | A1 | 12/2005 |
| JP | 2005352153 | A * | 12/2005 |
| JP | 2006-284783 | A1 | 10/2006 |
| JP | 2007-233054 | A1 | 9/2007 |
| JP | 2007233054 | A * | 9/2007 |
| WO | WO 2006/030648 | A1 | 3/2006 |

OTHER PUBLICATIONS

Machine translation of JP 2007-233054.*
Machine translation of JP 2005-352153.*
International Search Report for International Application No. PCT/JP2009/052465 dated Mar. 4, 2009.

(Continued)

*Primary Examiner* — Christ Mahoney
*Assistant Examiner* — Linda Smith
(74) *Attorney, Agent, or Firm* — Kratz, Quintos & Hanson, LLP

(57) ABSTRACT

A blade drive device includes: a board having a shutter opening; a blade for adjusting an amount of light entering the shutter opening; and a transmitting member for transmitting a drive force to the blade. The transmitting member includes a drive pin swinging about a given support point. The blade has a first cam slot engaged with the drive pin and swinging about a given support point in conjunction with a swinging of the drive pin. The first cam slot includes a first permitting area and a first restricting area. The blade is permitted to swing when the drive pin is located in the first permitting area. The blade is restricted from swinging when the drive pin is located in the first restricting area.

8 Claims, 19 Drawing Sheets

OTHER PUBLICATIONS

First Notification of Office Action received from The State Intellectual Property Office of China in counterpart application No. 200980101061.4 dated May 31, 2011 with English translation (7 pages).

Notification of Submission of Opinion received from the Korean Intellectual Property Office in counterpart application No. 10-2009-7023993 dated Jul. 1, 2011 with English translation (8 pages).

* cited by examiner

FIG. 3
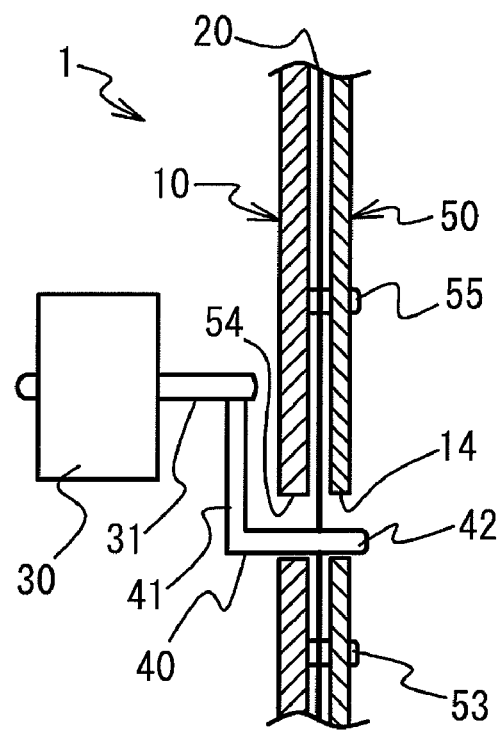
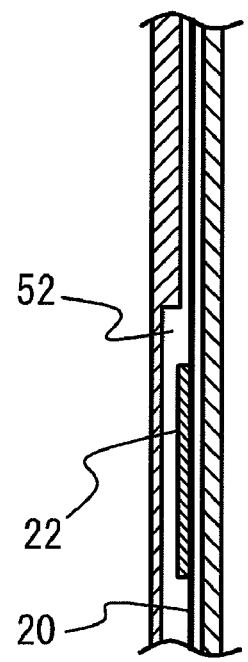

FIG. 4A
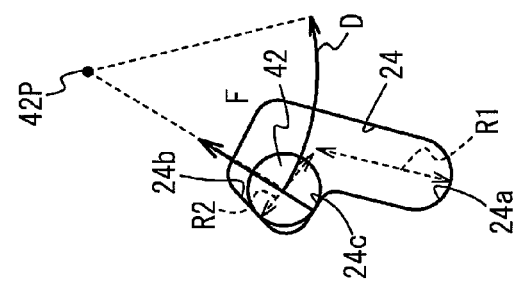
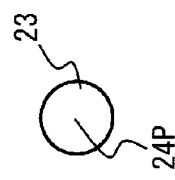
FIG. 4B
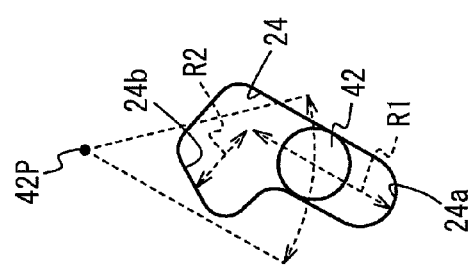
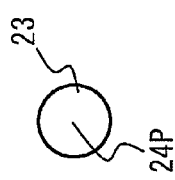
FIG. 4C
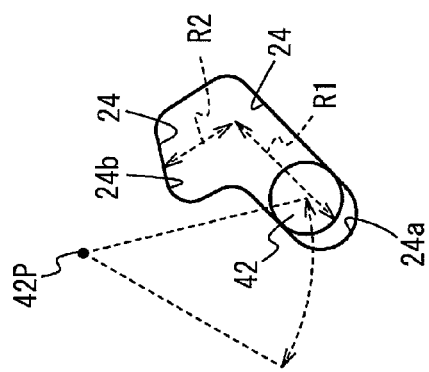
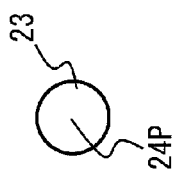

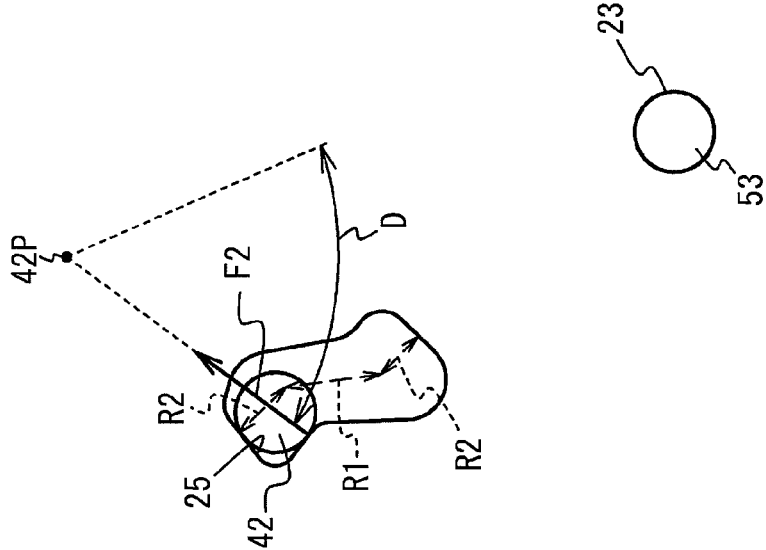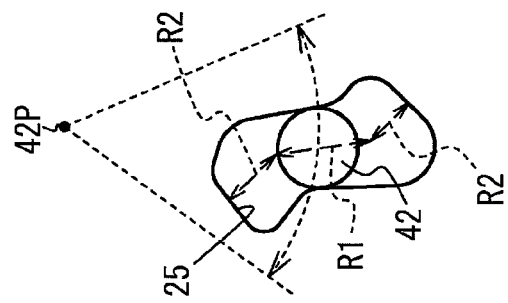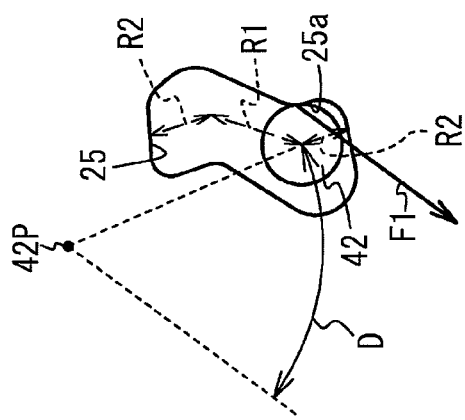

BLADE DRIVE DEVICE

CROSS-REFERENCE TO RELATED APPLICATION

This application is a continuation of and claims priority to International Patent Application No. PCT/JP2009/052465 filed on Feb. 16, 2009, which claims priority to Japanese Patent Application No. 2008-103845 filed on Apr. 11, 2008, subject matter of these patent documents is incorporated by reference herein in its entirety.

BACKGROUND OF THE INVENTION

1. Field of the Invention

The present invention relates to blade drive devices.

2. Description of the Related Art

There is known a blade drive device, which is installed in a camera, as disclosed in Japanese Unexamined Patent Publication No. 2005-352153. Such a blade drive device generally includes a board having an opening, a blade for adjusting the amount of light entering the opening, and a transmitting member for transmitting a drive force to the blade.

When an impact is applied to and an external force is affected to such a blade drive device, the blade may be displaced with respect to a desired position. Such a displacement may obtain no desired amount of entering light and may adversely affect a shooting image.

SUMMARY OF THE INVENTION

It is therefore an object of the present invention to provide a blade drive device in which a blade can be prevented from being displaced even when an impact is applied to and an external force is affected to the blade drive device, and a shooting image can be prevented from being adversely affected.

According to an aspect of the present invention, there is provided a blade drive device including: a board having a shutter opening; a blade for adjusting an amount of light entering the shutter opening; and a transmitting member for transmitting a drive force to the blade. The transmitting member includes a drive pin swinging about a given support point, the blade has a first cam slot engaged with the drive pin and swinging about a given support point in conjunction with a swinging of the drive pin, the first cam slot includes a first permitting area and a first restricting area, the blade is permitted to swing when the drive pin is located in the first permitting area, the blade is restricted from swinging when the drive pin is located in the first restricting area.

BRIEF DESCRIPTION OF THE DRAWINGS

Preferred embodiments of the present invention will be described in detail with reference to the following drawings, wherein:

FIG. 3 is a cross-sectional view of the blade drive device according to the first embodiment;

FIGS. 4A to 4C are views of a positional relationship in a periphery of a slot of the blade of the blade drive device according to the first embodiment;

FIGS. 7A to 7C are explanatory views of a positional relationship in a periphery of a slot of the blade of the blade drive device according to the second embodiment;

DESCRIPTION OF THE PREFERRED EMBODIMENTS

A description will be given of a blade drive device according to the present invention with reference to the drawings.

First Embodiment

Figure 1:
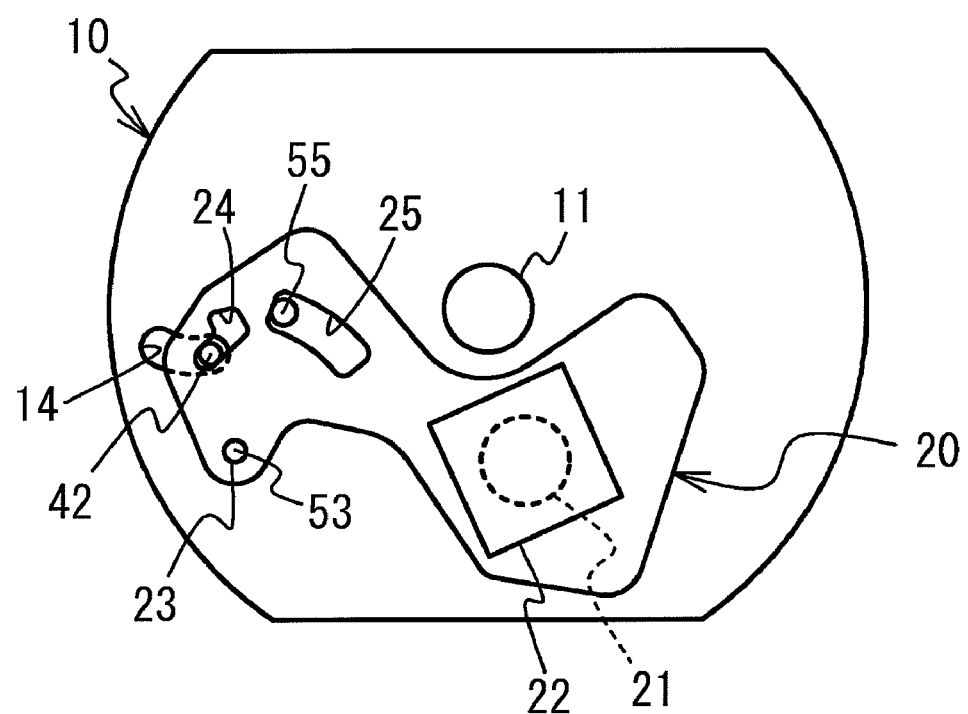
FIG. 1 is a front view of a blade drive device according to a first embodiment in which its blade is located in the receded position.
Figure 2:
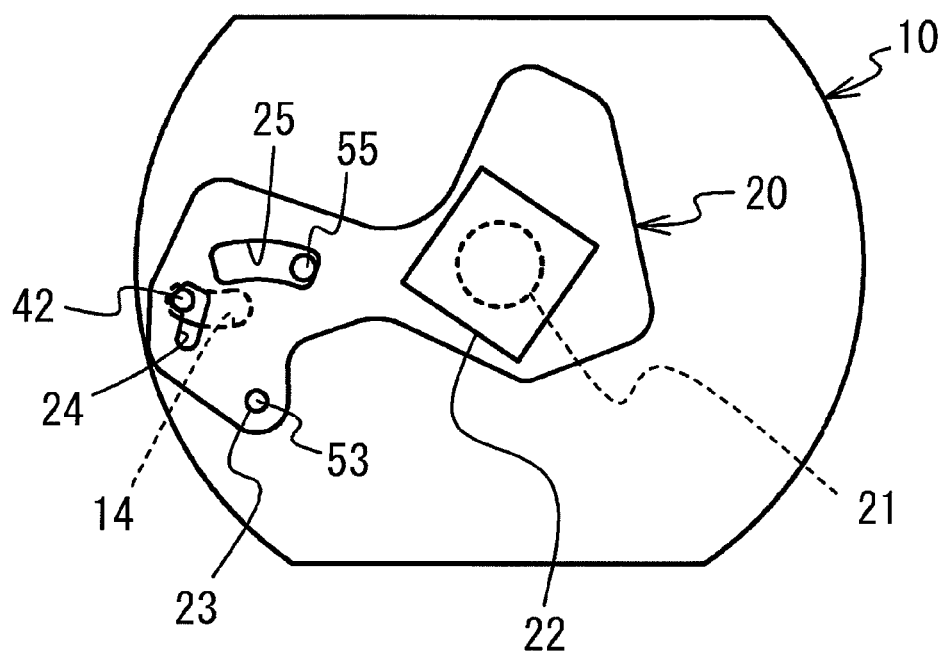
FIG. 2 is a front view of the blade drive device according to the first embodiment in which its blade is located in the overlapped position.

FIGS. 1 and 2 are front views of a blade drive device 1 according to a first embodiment, and FIG. 3 is a cross-sectional view of the blade drive device 1 according to the first embodiment. FIG. 1 illustrates the blade drive device 1 according to the first embodiment in which a blade 20 recedes from a shutter opening 11, and FIG. 2 illustrates the blade drive device 1 according to the first embodiment in which the blade 20 overlaps the shutter opening 11. As illustrated in FIGS. 1 to 3, the blade drive device 1 includes: a board 10; the blade 20; a motor 30; a transmitting member 40; and a blade supporting plate 50. The board 10 has a plate shape, and the shutter opening 11 at its center portion. Further, the blade supporting plate 50 has a shutter opening not illustrated.

The blade 20 has an opening 21 with a diameter which is substantially identical to that of the shutter opening 11. Further, an ND filter 22 is attached to the blade 20 from the board 10 side to cover the opening 21. The blade 20 is arranged between the board 10 and the blade supporting plate 50, as illustrated in FIG. 3. Also, the blade 20 is swingably supported about a hole 23. The hole 23 engages a fixed spindle 53 formed on the board 10. Further, the blade 20 has an oblong hole 25 engaging a restriction pin 55. Further, the blade 20 is formed with a cam slot 24 serving as a first cam slot engaging a drive pin 42 of the transmitting member 40, as illustrated in FIG. 3. The cam slot 24 has substantially a letter L shape and will be described later in more detail. The board 10 is provided with a recess portion 52, for avoiding an interference with the ND filter 22, at its given position.

The motor 30 is a drive source for swinging the blade 20. The motor 30 is provided with a rotary shaft 31, and the transmitting member 40 is fixed thereto. The transmitting member 40 has a function for transmitting a drive force from the motor 30 to the blade 20. The transmitting member 40 includes: an arm 41 radially and outwardly extending from the rotary shaft 31; and the drive pin 42 extending parallel to the axial direction of the rotary shaft 31. The transmitting member 40 is made of resin. The motor 30 is capable of rotating within a given range. The rotation of the motor 30 swings the drive pin 42 about the rotary shaft 31 within a given range. In addition, the board 10 and the blade supporting plate 50 are respectively formed with receiving holes 14 and 54 for receiving the swinging of the drive pin 42, as illustrated in FIG. 3. Each of the receiving holes 14 and 54 is formed into a circular shape.

Additionally, the drive pin 42 engages the cam slot 24 formed in the blade 20. The blade 20 swings about the hole 23 within a given range, in response to the swinging of the drive pin 42. As illustrated in FIGS. 1 and 2, the blade 20 swings between a position (hereinafter referred to as receded position) where the blade 20 recedes from the shutter opening 11 and a position (hereinafter referred to as overlapped position) where the blade 20 overlaps the shutter opening 11. Also, when the blade 20 is located in the receded position, the restriction pin 55 abuts one end of the oblong hole 25. Thus, the blade 20 is restricted from swinging clockwise from a state illustrated in FIG. 1. Further, when the blade 20 is located in the overlapped position, the restriction pin 55 abuts the other end of the oblong hole 25. Thus, the blade 20 is restricted from swinging counterclockwise from a state illustrated in FIG. 2.

Furthermore, when the blade 20 is located in the receded position, the drive pin 42 abuts one end of the cam slot 24, as illustrated in FIG. 1, and when the blade 20 is located in the overlapped position, the drive pin 42 abuts the other end of the cam slot 24. When the blade 20 is located in the overlapped position, the light entering the shutter opening 11 is reduced by the ND filter 22. In this manner, the blade 20 swings between the receded and overlapped positions, thereby adjusting the amount of the light entering the shutter opening 11.

Next, a description will be given of a feature of the blade drive device 1 according to the present embodiment. FIGS. 4A to 4C are explanatory views of a positional relationship in the periphery of the cam slot 24. FIG. 4A illustrates the positional relationship in the periphery of the cam slot 24 when the blade 20 is located in the receded position. FIG. 4B illustrates the positional relationship in the periphery of the cam slot 24 while the blade 20 is shifting to the overlapped position from the receded position. FIG. 4C illustrates the positional relationship in the periphery of the cam slot 24 when the blade 20 is located in the overlapped position.

First, the shape of the cam slot 24 will be described. The cam slot 24 includes a permitting area R1 and a restricting area R2 respectively serving as a first permitting area and a first restricting area. When the drive pin 42 is located in the permitting area R1, the blade 20 is permitted to swing. When the drive pin 42 is located in the restricting area R2, the blade 20 is restricted from swinging. The cam slot 24 has the letter L shape such that the permitting area R1 and the restricting area R2 are perpendicular to each other. Additionally, the permitting area R1 is longer than the restricting area R2.

As illustrated in FIG. 4A, when the blade 20 is located in the receded position, the drive pin 42 abuts the one end portion 24a of the cam slot 24. The drive pin 42 swings clockwise about a support point 42P (rotary shaft 31) from this state, whereby the drive pin 42 moves away from the one end portion 24a within the cam slot 24 and whereby the cam slot 24 swings counterclockwise about a support point 24P (fixed spindle 53). Thus, a state illustrated in FIG. 4B is shifted from the state illustrated in FIG. 4A. In FIG. 4B, the drive pin 42 is located in a partway of the permitting area R1.

When the drive pin 42 further swings clockwise from the state in FIG. 4B, the cam slot 24 further swings counterclockwise in response to the swinging of the drive pin 42, whereby the drive pin 42 escapes from the permitting area R1 and moves into the restricting area R2. Thus, the state illustrated in FIG. 4B is shifted to the state illustrated in FIG. 4C. As described above, in the state illustrated in FIG. 4C, the restriction pin 55 abuts the other end of the oblong hole 25, thereby restricting the blade 20 from swinging counterclockwise. Additionally, in this state, the drive pin 42 abuts the other end portion 24b. Further, the blade 20 swings such that the cam slot 24 passes between the support point 42P of the drive pin 42 and the fixed spindle 53, that is, between the support point 42P and the support point 24P of the blade 20.

Next, a description will be given of a case where the blade 20 is affected by an external force which forces the blade 20 to swing clockwise and which is caused by a factor other than the drive pin 42. In such a case, the cam slot 24 tends to swing about the support point 24P, whereby the edge portion 24c of the restricting area R2 exerts a pressing force F to the drive pin 42. The pressing force F is exerted to the drive pin 42 in a direction substantially perpendicular to the edge portion 24c. Herein, since the drive pin 42 swings about the support point 42P, the drive pin 42 is movable only within a constant distance between the drive pin 42 and the support point 42P. That is, the drive pin 42 can move only in the swinging direction D illustrated in FIG. 4C. As illustrated in FIG. 4C, the direction of the pressing force F is substantially perpendicular to the swinging direction D. In this manner, since the direction of the pressing force F, that is, the direction in which the edge portion 24c affects the drive pin 42 is substantially perpendicular to the swinging direction D, even when the pressing force F is applied to the drive pin 42, the drive pin 42 does not escape from the restricting area R2 and remains in the restricting area R2. This suppresses the drive pin 42 from swinging in the swinging direction D. Accordingly, even when an external force, which forces the blade 20 to swing clockwise, is applied to the blade 20 in the state as illustrated in FIG. 4C, the blade 20 is restricted from swinging.

Therefore, for example, even when an impact or the like is applied to the blade drive device 1 to thereby exert an external force to the blade 20 with the blade 20 positioned in the overlapped position, the blade 20 is suppressed from being displaced from its desired position. Consequently, such a simple configuration can suppress adverse affect, on a shooting image, caused by the displacement of the blade 20.

Next, a description will be given of a case where the drive pin 42 receives the drive force of the motor 30 to swing counterclockwise from the state illustrated in FIG. 4C. When the drive pin 42 receives the drive force of the motor 30 to swing counterclockwise from the state illustrated in FIG. 4C, the drive pin 42 firstly swings along the edge portion 24c to be away from the other end portion 24b. The drive pin 42 nextly escapes from the restricting area R2 and moves to the permitting area R1. Then, the drive pin 42 moves in the permitting area R1 to about one end portion 24a again. In this way, the restricting area R2 is provided for permitting the swinging of the drive pin 42. That is, the drive pin 42 can move from the restricting area R2 to the permitting area R1 when the drive pin 42 swings from the state illustrated in FIG. 4C, whereas the drive pin 42 remains in the restricting area R2 when the blade 20 is affected by an external force. That is, the restricting area R2 permits the drive pin 42 to swing, whereas the restricting area R2 suppresses the blade 20 from swinging when the external force caused by a factor other than the drive pin 42 is applied to the blade 20. Such a configuration suppresses the blade 20 from being displaced caused by the impact or the like and ensures the swinging of the blade 20 between the receded and overlapped positions.

Second Embodiment

Figure 5:
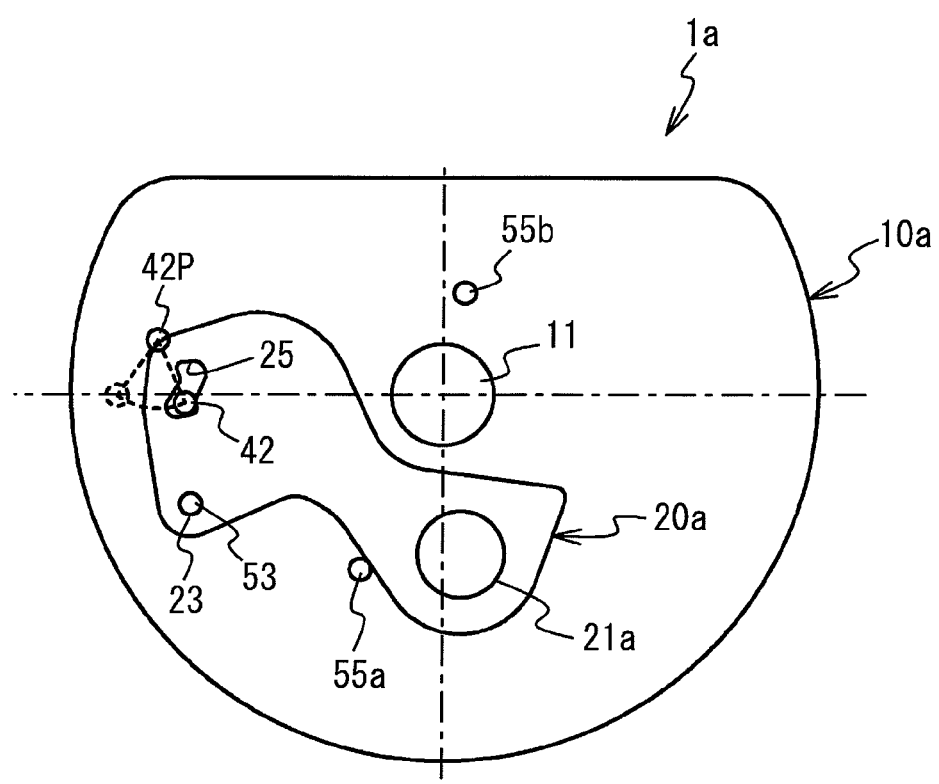
FIG. 5 is a front view of a blade drive device according to a second embodiment in which a blade is located in the receded position.
Figure 6:
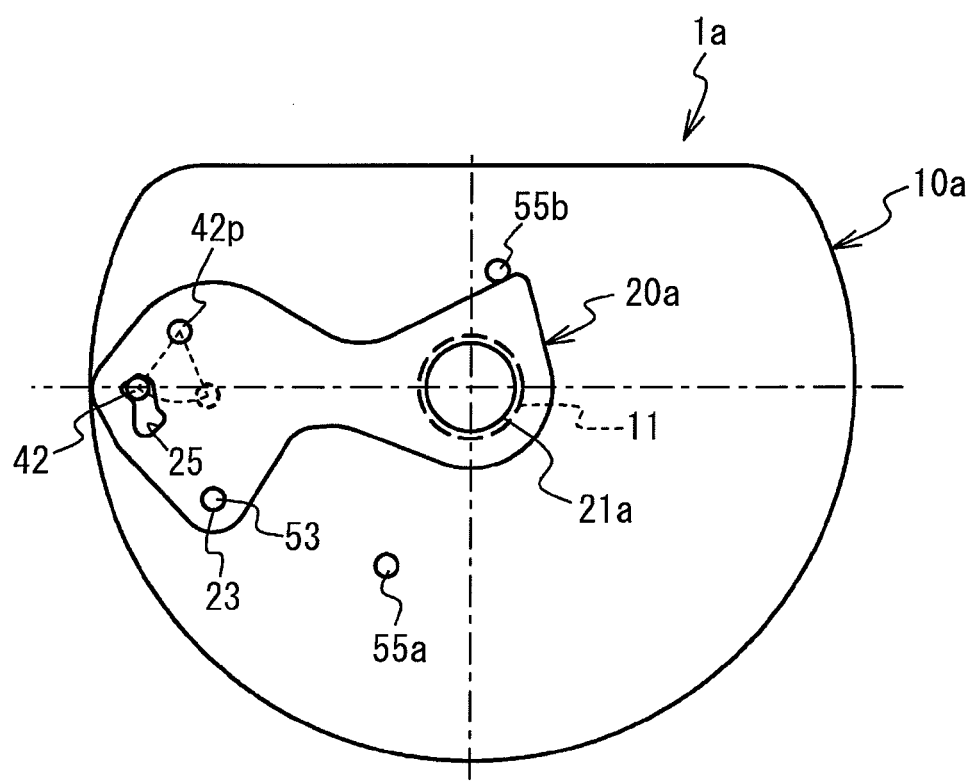
FIG. 6 is a front view of the blade drive device according to the second embodiment in which a blade is located in the overlapped position.

Next, a description will be given of a blade drive device 1a according to a second embodiment. FIGS. 5 and 6 are front views of the blade drive device 1a according to the second embodiment. FIG. 5 illustrates the blade drive device 1a according to the second embodiment in which a blade 20a recedes from the shutter opening 11. FIG. 6 illustrates the blade drive device 1a according to the second embodiment in which the blade 20a overlaps the shutter opening 11. In addition, in the embodiment to be described below, similar numerals depict similar components of the blade drive device 1 according to the first embodiment in order to omit a duplicate description.

As illustrated in FIGS. 5 and 6, the blade drive device 1a includes: a board 10a; the blade 20a, a motor not illustrated; a transmitting member; and a blade supporting plate. The blade 20a has an opening 21a with diameter smaller than that of the shutter opening 11 formed at a center portion of the board 10a. As illustrated in FIG. 6, when the blade 20a is located in the overlapped position, the amount of the light entering the shutter opening 11 is reduced by the opening 21a. Further, the blade 20a is swingably supported about the hole 23, and the hole 23 engages the fixed spindle 53 formed in the board 10a.

The blade 20a is formed with a cam slot 25 serving as a first cam slot. The cam slot 25 engages the drive pin 42 for transmitting the drive force from the motor to the blade, as illustrated in FIGS. 5 and 6. In response to the swinging of the drive pin 42, the blade 20a swings about the hole 23 between the receded position where the blade 20a recedes from the shutter opening 11 and the overlapped position where the blade 20a overlaps the shutter opening 11. Further, as illustrated in FIG. 5, the board 10a is provided with a restriction pin 55a which abuts an end portion of the blade 20a when the blade 20a is located in the receded position. This restricts the blade 20a from swinging clockwise from the state illustrated in FIG. 5. Additionally, when the blade 20a is located in the overlapped position, a restriction pin 55b abuts the blade 20a at another end portion thereof across the opening 21a. This restricts the blade 20a from swinging counterclockwise from the state illustrated in FIG. 6.

A description will be given of a feature of the blade drive device 1a according to the second embodiment. FIGS. 7A to 7C are explanatory views of a positional relationship in the periphery of the cam slot 25. FIG. 7A illustrates the positional relationship in the periphery of the cam slot 25 when the blade 20a is located in the receded position. FIG. 7B illustrates the positional relationship in the periphery of the cam slot 25 while the blade 20a is shifting to the overlapped position from the receded position. FIG. 7C illustrates the positional relationship in the periphery of the cam slot 25 when the blade 20a is located in the overlapped position.

Herein, unlike the first embodiment, the cam slot 25 of the blade drive device 1a according to the second embodiment includes a permitting area R1, serving as a first permitting area, and restricting areas R2, serving as first restricting areas, located at both ends of the cam slot 25. When the drive pin 42 is located in the permitting area R1, the blade 20a is permitted to swing. When the drive pin 42 is located in the restricting areas R2, the blade 20a is restricted from swinging. In the second embodiment, the cam slot 25 has the restricting areas R2 at its both end portions and is formed into a letter S shape such that the permitting area R1 is substantially perpendicular to the restricting areas R2. Additionally, the permitting area R1 is longer than the restricting area R2.

Like the first embodiment, in a case where the blade 20a is affected by an external force which forces the blade 20a to swing counterclockwise from the state illustrated in FIG. 7A and which is caused by a factor other than the drive pin 42, an edge portion 25a in the restricting area R2 exerts the pressing force F1 to the drive pin 42. The pressing force F1 exerts the drive pin 42 in the direction substantially perpendicular to the edge portion 25a. Herein, since the drive pin 42 swings about the support point 42P, the drive pin 42 always moves only within a constant distance between the drive pin 42 and the support point 42P. That is, the drive pin 42 can merely move in the swinging direction D illustrated in FIG. 7A. In this manner, since the direction of the pressing force F1, that is, the direction in which the blade 20a moves is substantially perpendicular to the swinging direction D, even when the pressing force F1 is applied to the drive pin 42, the drive pin 42 does not escape from the restricting areas R2 and remains in the restricting areas R2. Therefore, the drive pin 42 is restricted from swinging in the swinging direction D. Accordingly, even when the blade 20a is affected by an external force which forces the blade 20a to swing counterclockwise in the state illustrated in FIG. 7A, the blade 20a is restricted from swinging.

Similarly, even when the blade 20a is affected by an external force which forces the blade 20a to swing clockwise in the state illustrated in FIG. 7C, the blade 20a is restricted from swinging, since the direction of the pressing force F2 and the swinging direction D of the drive pin 42 are substantially perpendicular to each other.

Therefore, even when the drive pin 42 is positioned at one of two restricting areas R2 located at the both ends of the cam slot 25, that is, even when the blade 20a is located in the receded position or the overlapped position and an impact or the like is applied to thereby exert an external force to the blade drive device 1a, the blade 20a is suppressed from being displaced with respect to a desired position. Accordingly, such a simple structure can suppress adverse affect, on a shooting image, caused by the displacement of the blade 20a.

Third Embodiment

Figure 8A:
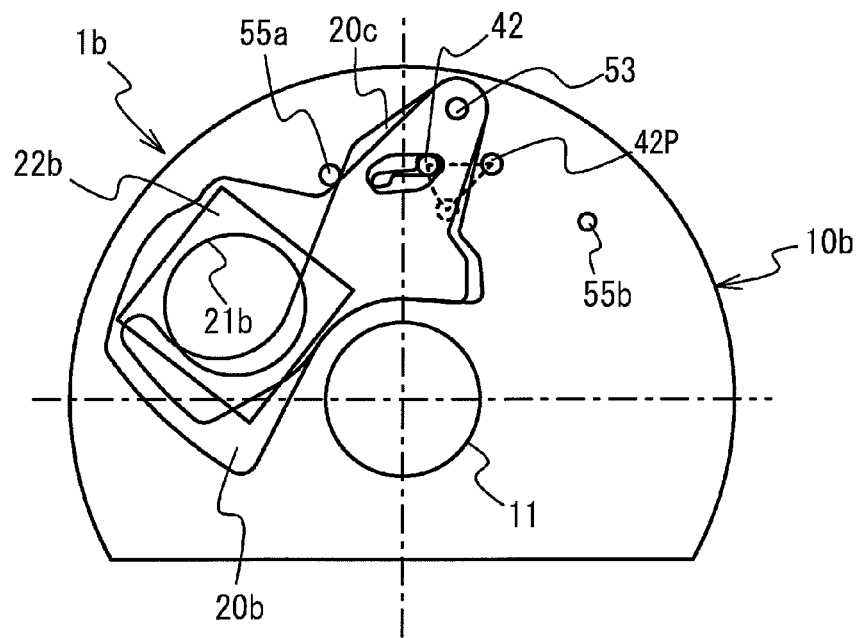
FIG. 8A is a front view of a blade drive device according to a third embodiment in which its blade is located in a receded position.
Figure 8B:
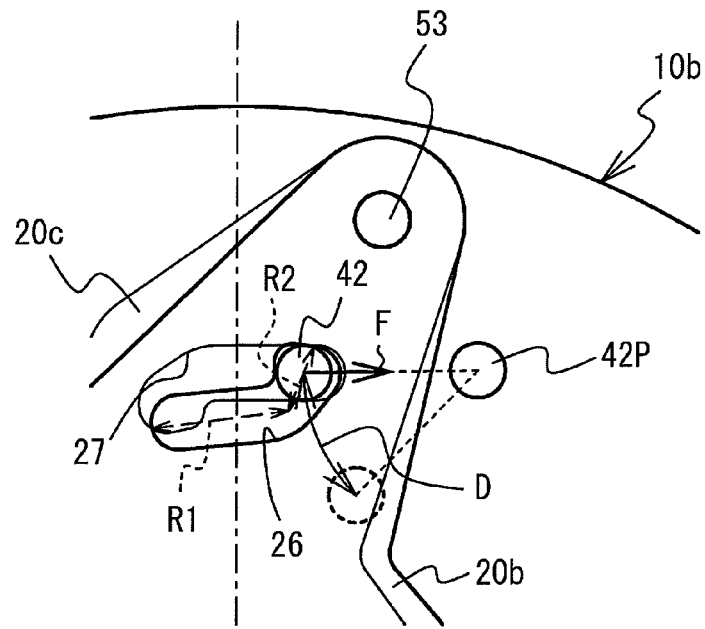
FIG. 8B is an enlarged view of a periphery of slots of the blade drive device in this state.
Figure 9A:
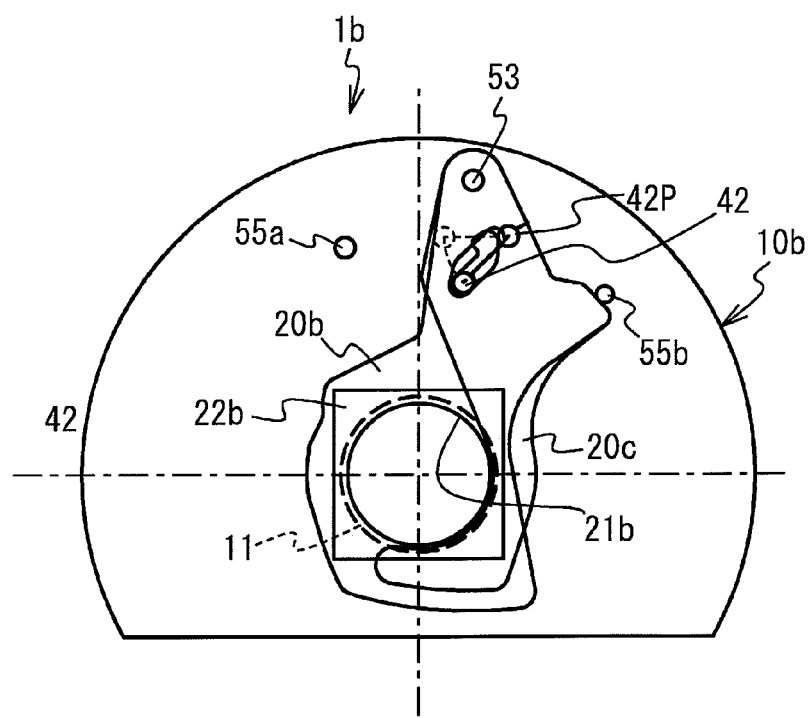
FIG. 9A is a front view of the blade drive device according to the third embodiment in which its blade is located in an overlapped position.
Figure 9B:
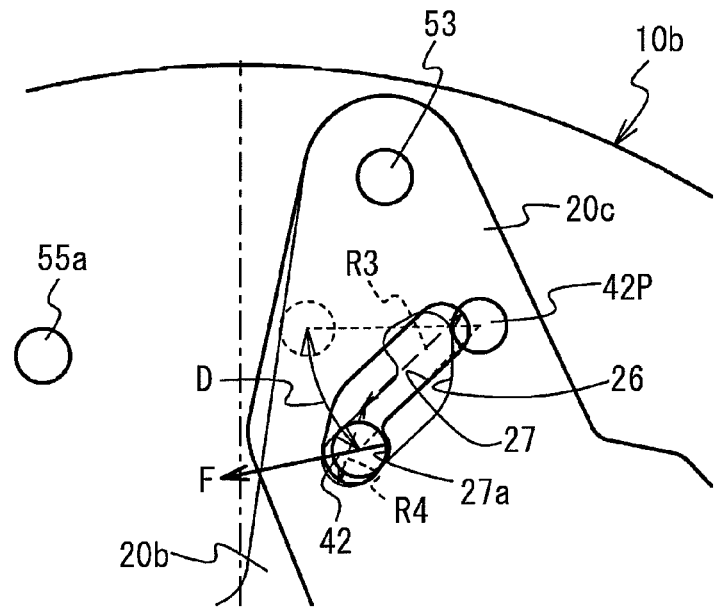
FIG. 9B is an enlarged view of a periphery of slots in this state.

Next, a description will be given of a blade drive device 1b according to a third embodiment. FIGS. 8A, 8B, 9A, and 9B are front views of the blade drive device 1b according to the third embodiment. FIG. 8A is a view of the blade drive device 1b according to the third embodiment in which a blade 20b and a support blade 20c recede from the shutter opening 11. FIG. 8B is an enlarged view of the blade drive device 1b in the above state. FIG. 9A is a view of the blade drive device 1b according to the third embodiment in which the blade 20b overlaps the shutter opening 11. FIG. 9B is an enlarged view of the blade drive device 1b in the above state.

As illustrated in FIGS. 8A, 8B, 9A, and 9B, the blade drive device 1b includes a board 10b, the blade 20b, the support blade 20c, a motor, not illustrated, a transmitting member, and a blade supporting plate. The blade 20b is provided with an opening 21b having a diameter substantially identical to that of the shutter opening 11 formed at the center portion of the board 10. Further, an ND filter 22b is attached to the blade 20b from the board 10b side so as to cover the opening 21b. As illustrated in FIGS. 9A and 9B, when the blade 20b is located in the receded position, the amount of light entering the shutter opening 11 is reduced by the ND filter 22b. Also, the blade 20a and the support blade 20c engage the identical fixed spindle 53 formed on the board 10a so as to be swingably supported. In this way, the blade 20b and the support blade 20c cooperatively adjust the amount of light entering the shutter opening 11.

The blade 20b and the support blade 20c are formed with a cam slot 26, serving as a first cam slot, and a cam slot 27, serving as a second cam slot, respectively. Referring to FIGS. 8B and 9B, the drive pin 42, which transmits the drive force from the motor to the blade, engages the cam slots 26 and 27. In response to the swinging of the drive pin 42 from one end to the other end of the swinging range, the blade 20b and the support blade 20c swing about the identical fixed spindle 53 from the receded position, where they recede from the shutter opening 11, to the overlapped position, where the blade 20b overlaps the shutter opening 11. Further, the support blade 20c and the blade 20b are restricted from swinging in the clockwise direction from the state illustrated in FIG. 8A by the restriction pin 55a, and are restricted from singing in the counterclockwise direction from the state illustrated in FIG. 9A by the restriction pin 55b.

Herein, in the blade drive device 1b according to the third embodiment, the cam slot 26 of the blade 20b includes a permitting area R1, serving as a first permitting area, and a restricting area R2, serving as a first restricting area. The cam slot 27 of the support blade 20c configures a permitting area R3, serving as a second permitting area, and a restricting area R4, serving as a second restricting area. When the drive pin 42 is located in the permitting areas R1 or R3, the blade 20a and the support blade 20c are permitted to swing. When the drive pin 42 is located in the restricting areas R2 or R4, the blade 20a and the support blade 20c are restricted from swinging.

Herein, when an external force, which is caused by a factor other than the drive pin 42, is exerted to the blade 20b to swing counterclockwise from the state of FIG. 8A, the swinging direction D is substantially perpendicular to the direction of a pressing force F which is exerted to the drive pin 42 by an edge portion 26a of the restricting area R2 as illustrated in FIG. 8B. Therefore, the drive pin 42 does not escape from the restricting area R2 and remains in the restricting area R2. Accordingly, even when an external force is exerted to swing the blade 20b and the support blade 20c counterclockwise, the blade 20b and the support blade 20c are restricted from swinging.

Similarly, when an external force, which is caused by a factor other than the drive pin 42, is exerted to the support blade 20c to swing clockwise from the state of FIG. 9A, the swinging direction D is substantially perpendicular to the direction of the pressing force F which is exerted to the drive pin 42 by an edge portion 27a of the restricting area R4, as illustrated in FIG. 9B. Therefore, the drive pin 42 does not escape from the restricting area R4 and remains in the restricting area R4. Accordingly, even when an external force is exerted to swing the blade 20b and the support blade 20c clockwise, the blade 20b and the support blade 20c are restricted from swinging.

In the blade drive device 1b, the drive pin 42 engages the restricting area R2 of the cam slot 26 of the blade 20b in the receded position, and the drive pin 42 engages the restricting area R4 of the cam slot 27 of the support blade 20c in the overlapped position. In other words, when the drive pin 42 swings to reach one end of the second cam slot 27 of the support blade 20c, the drive pin 42 engages the first cam slot 26 of the blade 20b in the first restricting area R2. When the drive pin 42 swings to the other end of the second cam slot 27 of the support blade 20c, the drive pin 42 engages the second cam slot 27 of the support blade 20c in the second restricting area R4. In this way, the restricting areas R2 and R4 are respectively provided in separate cam slots, that is, in the cam slot 26 of the blade 20b and the cam slot 27 of the support blade 20c. This securely prevents the blade 20b from being displaced in the receded and overlapped positions with certainty, even in a case where the cam slot 26 of the blade 20b cannot be provided with the restricting areas R2 at its both ends and with the permitting area R1 at its partway due to a limitation of the shape of the blade 20b based on the space defining the blade drive device 1b or a limitation in the positional relationship of the fixed spindle 53. That is, even when the blade 20b and the support blade 20c are located in the receded position or the overlapped position with the blade drive device 1b affected by an external force due to an impact or the like, the blade 20b and the support blade 20c are securely suppressed from being displaced with respect to the desired positions. Such a configuration thus suppresses the shooting image from being adversely affected in accordance with the displacement of the blade 20b.

Fourth Embodiment

Figure 10:
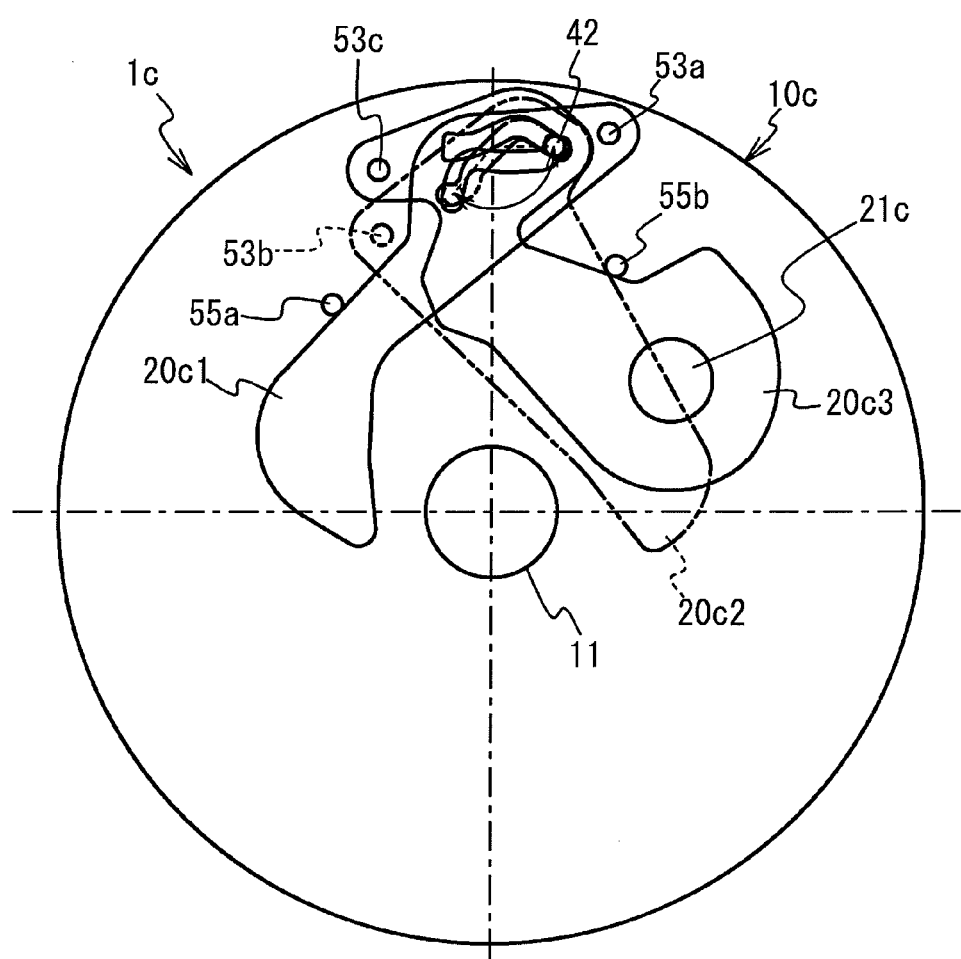
FIG. 10 is a front view of a blade drive device according to a fourth embodiment in which its blade is located in the fully opened position.
Figure 11:
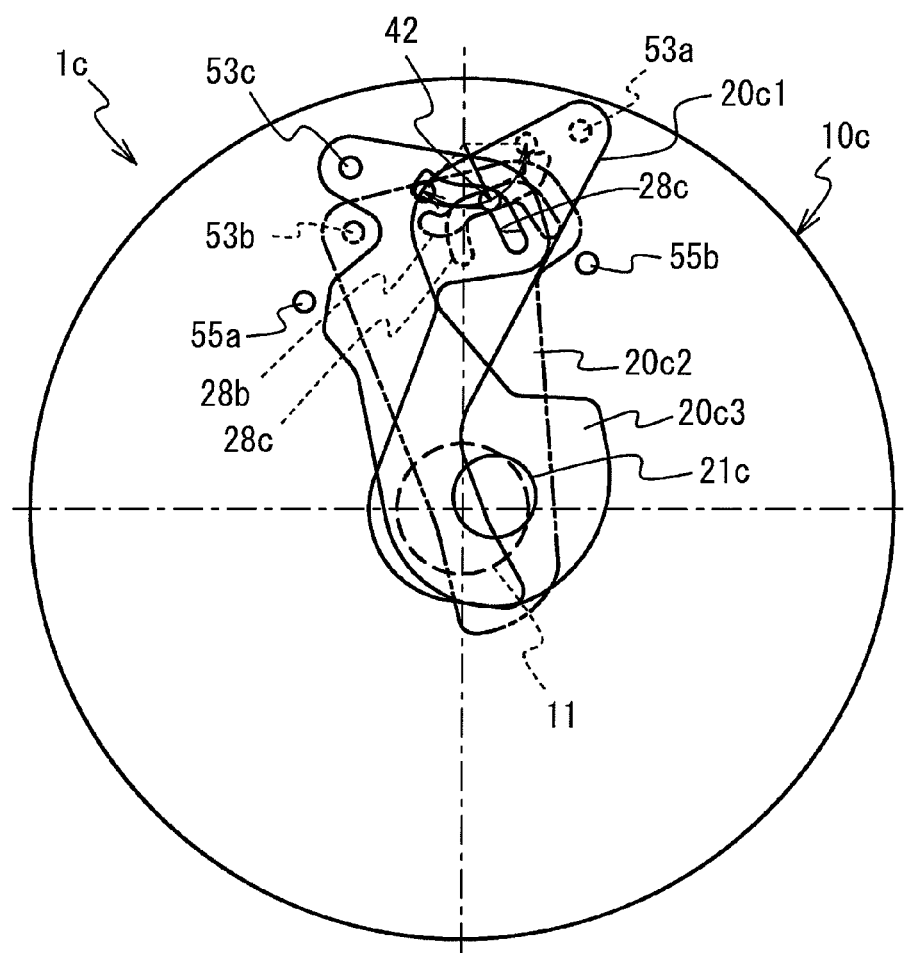
FIG. 11 is a front view of the blade drive device according to the fourth embodiment in which its blade is located in the fully closed position.
Figure 12:
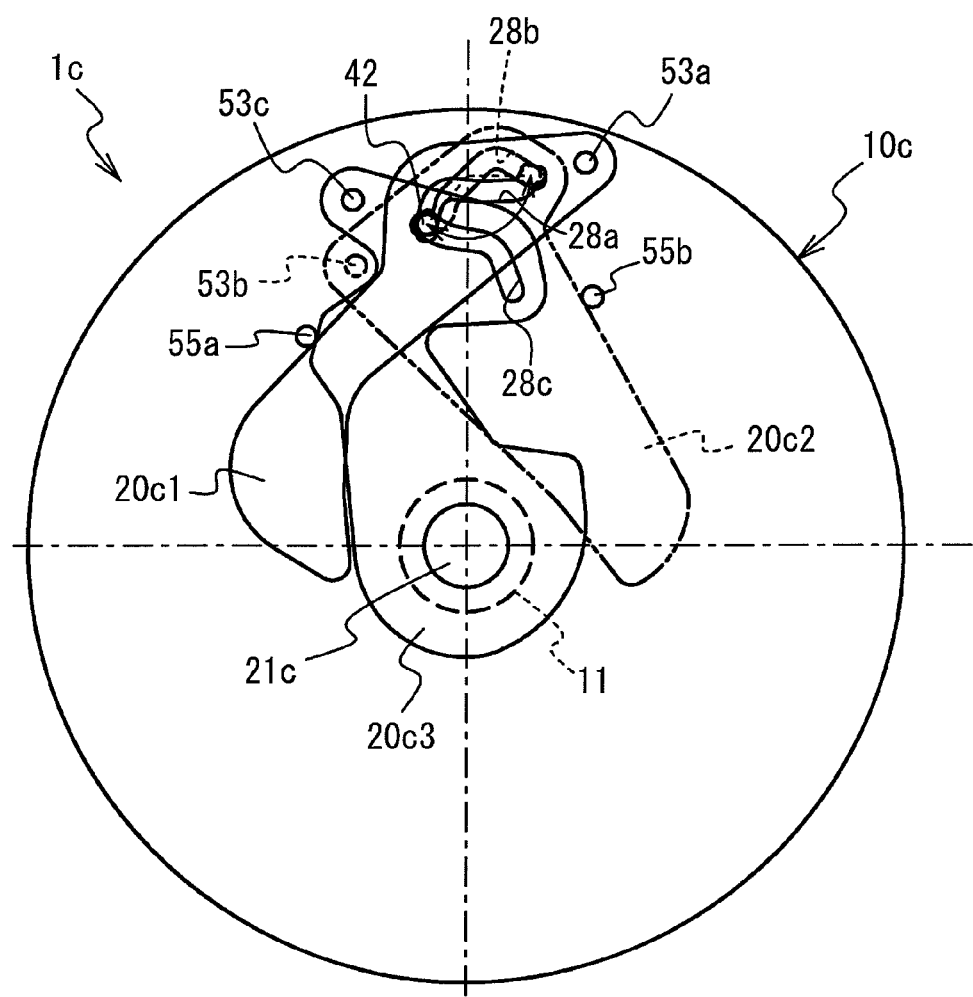
FIG. 12 is a front view of the blade drive device according to the fourth embodiment in which its blade is located in the small aperture position.
Figure 13A:
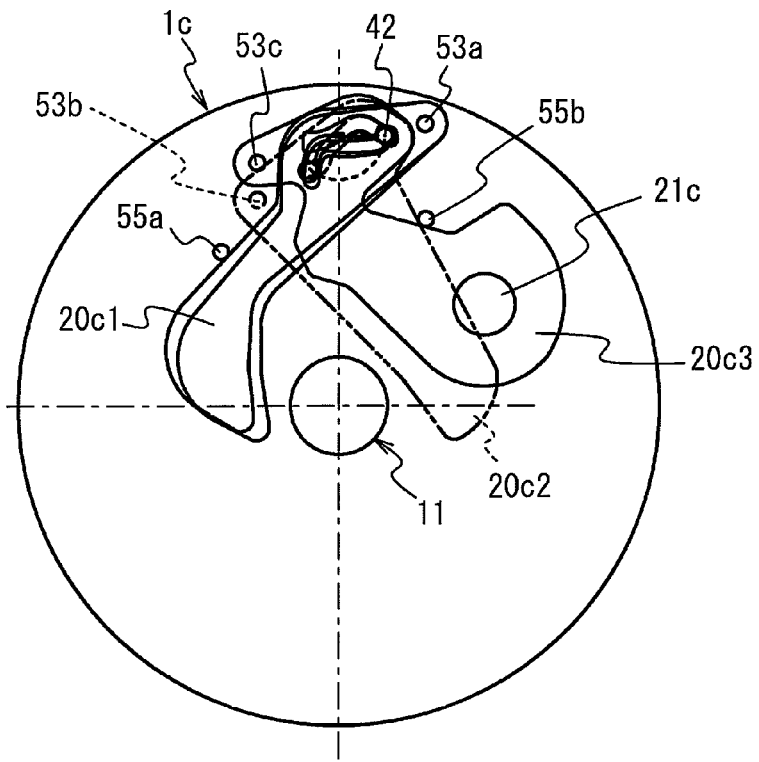
FIG. 13A is a front view of the blade drive device according to the fourth embodiment where the blade is restricted from swinging in the fully opened position.
Figure 13B:
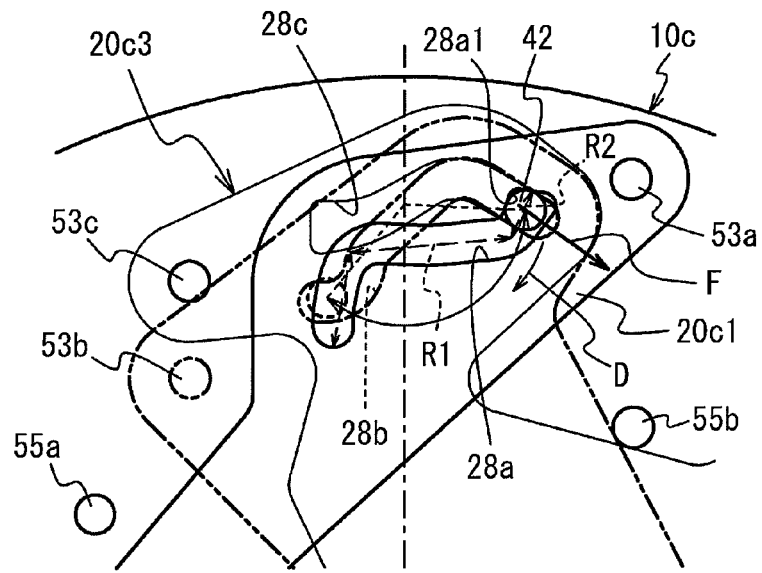
FIG. 13B is an enlarged view of a periphery of slots in this state.
Figure 14:
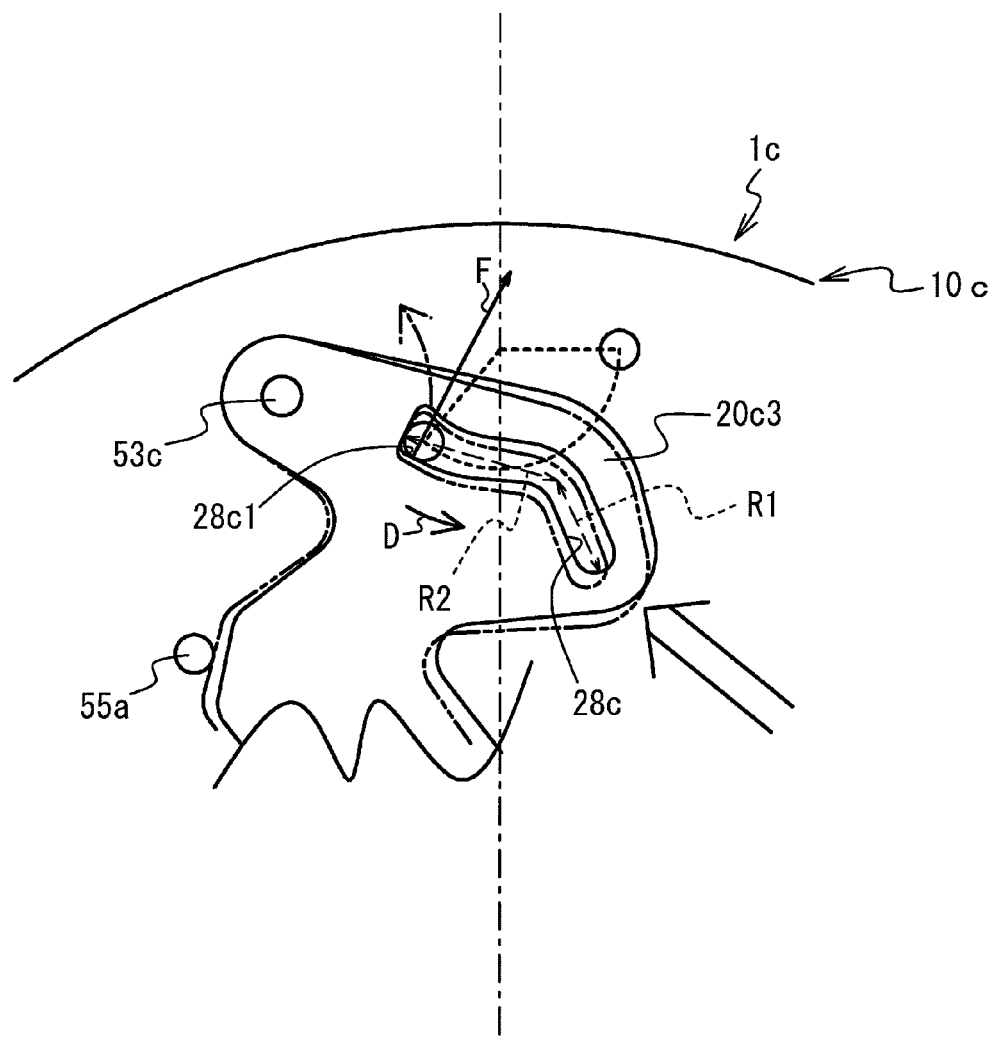
FIG. 14 is an enlarged view of the periphery of the slots with the blade restricted from swinging when the blade of the blade drive device according to the fourth embodiment is located in the small aperture position.

Next, a description will be given of a blade drive device 1c according to a fourth embodiment. The blade drive device 1c according to the fourth embodiment is configured such that the shutter opening 11 remains any one of a fully opened state, a fully closed state, and a small aperture state. FIG. 10 is a front view of the blade drive device 1c where the blade is located in the fully opened position. FIG. 11 is a front view of the blade drive device 1c where the blade is located in the fully closed position. FIG. 12 is a front view of the blade drive device 1c where the blade is located in the small aperture position. Further, FIG. 13A is a front view of the blade drive device 1c where the blade is restricted from swinging in the fully opened position. FIG. 13B is an enlarged view of a periphery of cam slots in this state. FIG. 14 is an enlarged view of the periphery of the cam slots in the state where the blade is restricted from swinging in the small aperture position.

The blade drive device 1c includes a board 10c having the shutter opening 11, and plural blades including: blades 20c1 and 20c2; a small aperture blade 20c3 having a small aperture opening 21c with the diameter smaller than that of the shutter opening 11. The blades 20c1 and 20c2 and the small aperture blade 20c3 are engaged with, and are swingably supported by fixed spindles 53a, 53b, and 53c, respectively, formed on the board 10c. The blades 20c1 and 20c2 and the small aperture blade 20c3 are respectively provided with cam slots 28a, 28b, and 28c which engage the drive pin 42 transmitting the drive force supplied from the motor to the blades. In response to the swinging of the drive pin 42 from one end to the other end, the blades 20c1 and 20c2 and the small aperture blade 20c3 respectively rotate about the fixed spindles 53a, 53b, and 53c so that the shutter opening 11 is brought into the fully opened position, the fully closed position, and the small aperture position, in this order. In this way, in the blade drive device 1c, the plural blades bring the shutter opening 11 into any one of the fully opened state, the fully closed state, and the small aperture state, thereby adjusting the amount of the entering light. Additionally, as illustrated in FIG. 10, the board 10c is provided with restriction pins 55a and 55b which come into contact with edge portions of the blades 20c1 and 20c2 and the small aperture blade 20c3, when the blades 20c1 and 20c2 and the small aperture blade 20c3 are positioned in the fully opened positions or the small aperture positions. This restricts each of blades from swinging to the fully opened position side or the small aperture position side with the fully closed position set as a center.

Herein, the cam slot 28a of the blade 20c1 and the cam slot 28c of the small aperture blade 20c3, serving as the first cam slots of the blade drive device 1c according to the fourth embodiment, each has the permitting area R1, serving as the first permitting area, and the restricting area R2, serving as the first restricting area. When the drive pin 42 is located in the permitting area R1, the blade 20c1 and the small aperture blade 20c3 are permitted to swing. When the drive pin 42 is located in the restricting area R2, the blade 20c1 and the small aperture blade 20c3 are restricted from swinging.

A description will be given of a feature of the blade drive device 1c according to the fourth embodiment. FIG. 13A is a front view of the state where the blade 20c1 is restricted from swinging when an external force which is caused by a factor other than the drive pin 42 is exerted to swing the blade 20c1 counterclockwise. FIG. 13B is an enlarged view of the cam slots and their peripheries at this time.

Herein, when an external force which is caused by a factor other than the drive pin 42 is exerted to swing the blade 20c1 counterclockwise, the blade 20c1 swings counterclockwise until the drive pin 42 engages an edge portion 28a1 of the cam slot 28a in the blade 20c1, as illustrated in FIGS. 13A and 13B. In this position, the direction of the pressing force F, which is applied to the drive pin 42 by the edge portion 28a1 in the restricting area R2 of the cam slot 28a, is substantially perpendicular to the swinging direction D of the drive pin 42, whereby the drive pin 42 does not escape from the restricting area R2 and remains in the restricting area R2. Thus, even when the blade 20c1 is affected by an external force which swings the blade 20c1 counterclockwise, this swinging is restricted. This restricts the other blades 20c2 and small aperture blade 20c3 from swinging.

FIG. 14 is an enlarged view of the periphery of the cam slot 28c in the state, where the blade drive device 1c is in the small aperture position as illustrated in FIG. 12, and where the small aperture blade 20c3 is restricted from swinging, when an external force which is caused by a factor other than the drive pin 42 is exerted to swing the small aperture blade 20c3 counterclockwise. Similarly, when an external force which is caused by a factor other than the drive pin 42 is exerted to swing the small aperture blade 20c3 counterclockwise, the small aperture blade 20c3 swings counterclockwise until the drive pin 42 engages an edge portion 28c1 of the cam slot 28c in the small aperture blade 20c3. In this position, the direction of the pressing force F, which is affected to the drive pin 42 by the edge portion 28c1 in the restricting area R2 of the cam slot 28c, is substantially perpendicular to the swinging direction D of the drive pin 42, whereby the drive pin 42 does not escape from the restricting area R2 and remains in the restricting area R2. Thus, even when an external force is exerted to swing the small aperture blade 20c3 counterclockwise, this swinging is restricted. This restricts the other blades 20c1 and 20c2 from swinging.

In this manner, in the blade drive device having plural blades remain in any one of the fully opened position, the fully closed position, and the small aperture position regarding to the shutter opening 11, for example, when the drive pin 42 is located in the restricting area R2 of the cam slot 28a in the blade 20c1 positioned in the fully opened position and an external force is applied to the blade 20c1, the blade 20c1 is restricted from moving with respect to the board. The blade 20c2 and the small aperture blade 20c3 are also restricted from swinging. Accordingly, even when the plural blades are employed, these blades can be securely prevented from being displaced, and the shooting image can be prevented from being adversely affected.

Fifth Embodiment

Figure 15:
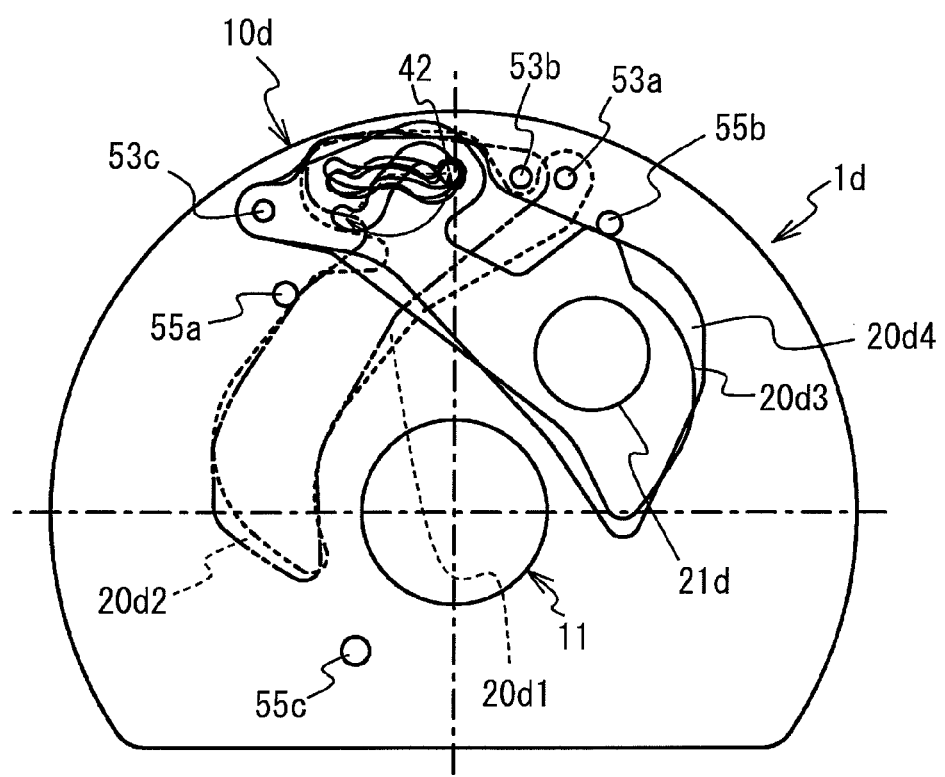
FIG. 15 is a front view of a blade drive device according to a fifth embodiment in which its blades are located in the fully opened position.
Figure 16:
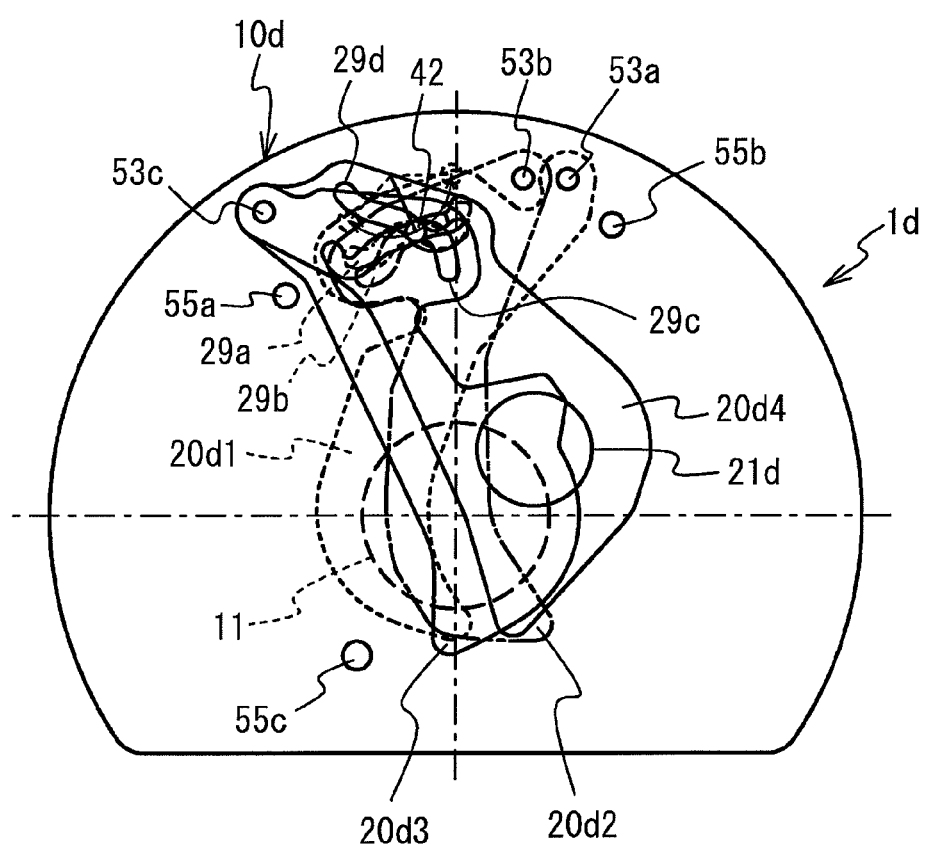
FIG. 16 is a front view of the blade drive device according to the fifth embodiment in which its blades are located in the fully closed position.
Figure 17:
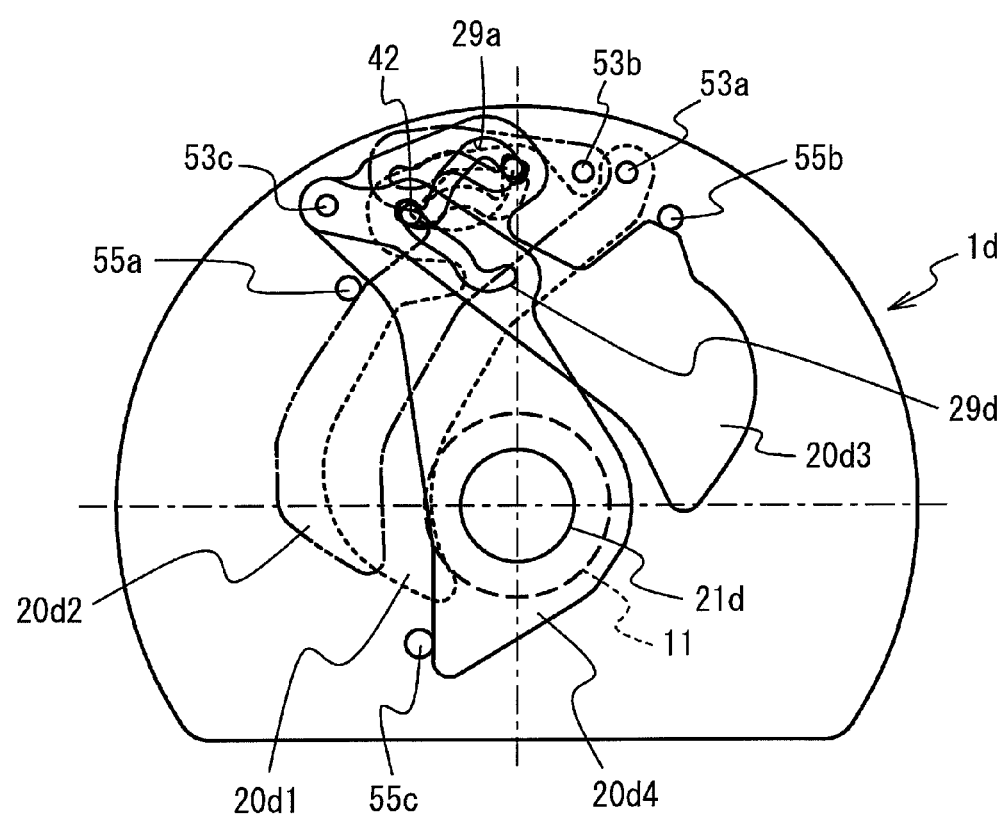
FIG. 17 is a front view of the blade drive device according to the fifth embodiment in which its blades are located in the small aperture position.
Figure 18A:
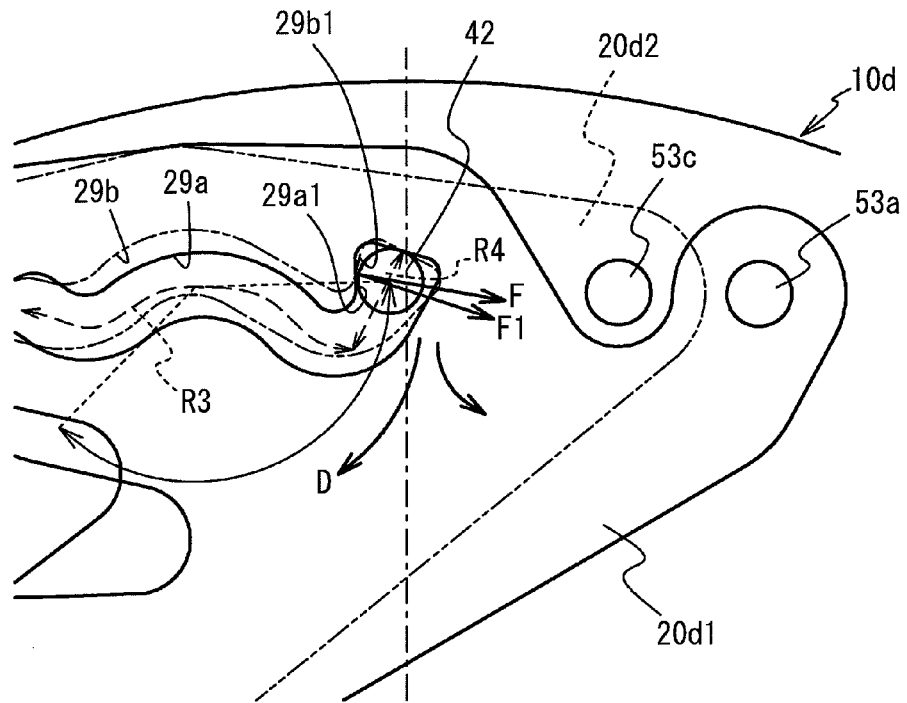
FIGS. 18A and 18B are enlarged views of the periphery of slots with the blades restricted from swinging when the blades of the blade drive device according to the fifth embodiment are located in the fully opened position.
Figure 18B:
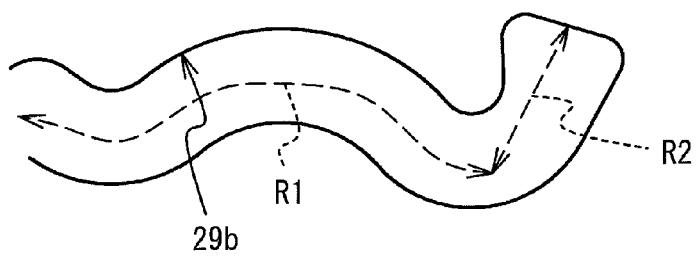
Figure 19A:
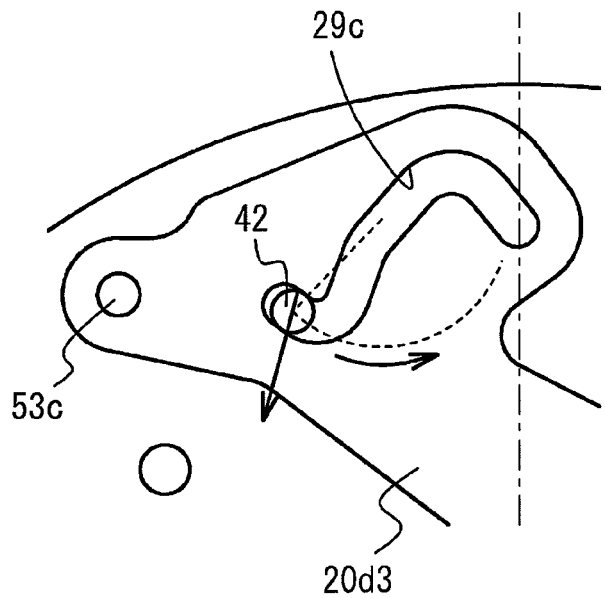
FIGS. 19A and 19B are enlarged views of the periphery of the slots with the blades restricted from swinging when the blades of the blade drive device according to the fifth embodiment are located in the small aperture position.
Figure 19B:
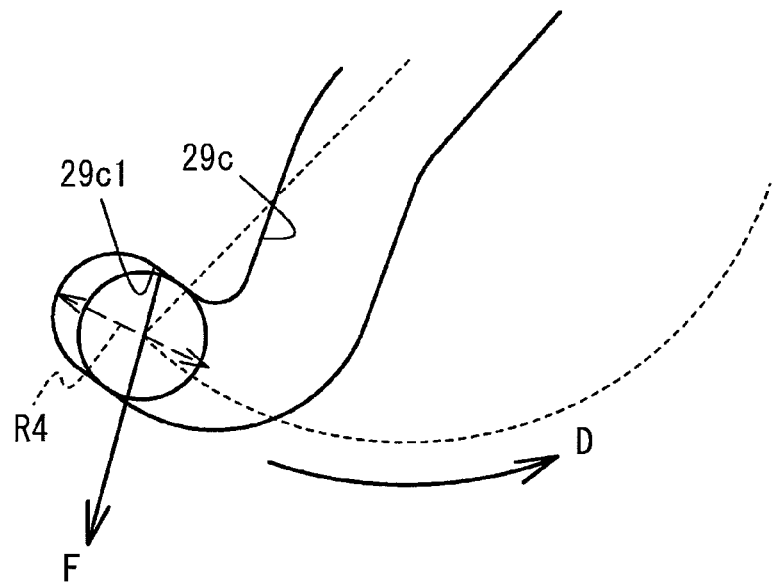

Next, a description will be given of a blade drive device 1d according to a fifth embodiment. Like the blade drive device 1c according to the fourth embodiment, the blade drive device 1d according to the fifth embodiment is capable of defining the shutter opening 11 into any one of the fully opened state, the fully closed state, and the small aperture state. FIG. 15 is a front view of a state where blades of the blade drive device 1d are located in the fully opened position. FIG. 16 is a front view of a state where the blades are located in the fully closed position. FIG. 17 is a front view of a state where the blades are located in the small aperture position. FIG. 18A is an enlarged view of the periphery of cam slots with the blades restricted from swinging when the blades of the blade drive device 1d are located in the fully opened position. FIGS. 19A and 19B are enlarged views of the periphery of the cam slots with the blades restricted from swinging when the blades are in the small aperture position. In addition, FIG. 18B illustrates only a cam slot 29b of FIG. 18A. A blade 20d1 is illustrated by solid lines in FIG. 18A.

The blade drive device 1d includes: a board 10d having the shutter opening 11; blades 20d1, 20d2, and 20d3; a small aperture blade 20d4 having a small aperture opening 21d. The blades 20d1 and 20d2 respectively engage the fixed spindles 53a and 53b formed on the board 10d. The blade 20d3 and the small aperture blade 20d4 are swingably supported by the fixed spindle 53c. The blades 20d1, 20d2 and 20d3, and the small aperture blade 20d4 are provided with cam slots 29a, 29b, 29c, and 29d, respectively, and engage the drive pin 42 for transmitting the drive force from the motor. In response to the swinging of the drive pin 42, the blades 20d1 and 20d2 swing about the fixed spindles 53a and 53b, respectively, whereas the blade 20d3 and the small aperture blade 20d4 swing about the fixed spindle 53c, such that the shutter opening 11 is brought into the fully opened state, the fully closed state, or the small aperture state, in this order. Further, as illustrated in FIGS. 15 and 17, the board 10d is provided with restriction pins 55a, 55b, and 55c which come into contact with edge portions of the blades 20c1, 20c2, and 20c3 and a small aperture blade 20c4, when the blades 20c1, 20c2, and 20c3 and the small aperture blade 20c4 are located in the fully opened position or the small aperture position. This restricts each of blades from swinging to the fully opened position side or the small aperture position side with the fully closed position set as a center.

Herein, the blades 20d1 and 20d2 of the blade drive device 1d are swingably supported by the different fixed spindles 53a and 53b and move toward the shutter opening 11 from the identical side to cooperatively cover the shutter opening 11. This allows the light entering the shutter opening 11 to be adjusted. That is, the blade 20d1 serves to support the blade 20d2 in the fully closed position and cover the shutter opening 11. Further, the blade 20d3 and the small aperture blade 20d4 are swingably supported by the identical fixed spindle 53c, and the blade 20d3 in the small aperture position is restricted from swinging counterclockwise by abutting the restriction pin 55b with an end portion of the blade 20d3. That is, the blade 20d3 serves to a support blade for holding the blade 20d4 in the small aperture position.

Herein, the cam slot 29b of the blade 20d2 of the blade drive device 1d according to the fifth embodiment includes the permitting area R1, serving as the first permitting area, and the restricting area R2, serving as the first restricting area. The cam slots 29a and 29c, of the support blades 20d1 and 20d3, respectively, include the permitting area R3, serving as the second permitting areas and the restricting areas R4, serving as the second restricting areas. When the drive pin 42 is located in the permitting areas R1 and R3, the blade 20d2 and the support blades 20d1 and 20d3 are permitted to swing. When the drive pin 42 is located in the restricting area R2 and R4, the support blades 20d1 and 20d3 are restricted from swinging.

A description will be given of a feature of the blade drive device 1d according to the fifth embodiment. FIGS. 18A and 18B are enlarged views of the periphery of the cam slots in the fully opened state as illustrated in FIG. 15, where the blades 20d1 and 20d2 are restricted from swinging when an external force which is caused by a factor other than the drive pin 42 is exerted to swing the blades 20d1 and 20d2 counterclockwise. FIGS. 19A and 19B are enlarged views of the periphery of the cam slot in the small aperture state as illustrated in FIG. 17, where the blade 20d3 is restricted from swinging when an external force is exerted to swing the blade 20d3 clockwise.

Herein, when an external force which is caused by a factor other than the drive pin 42 is exerted to swing the blades 20d1 and 20d2 counterclockwise, the pressing force F is applied to the drive pin 42 by an edge portion 29a1 in the restricting area R4 of the cam slot 29a in the blade 20d1. Further, the pressing force F1 is applied to the drive pin 42 by an edge portion 29b1 in the restricting area R2 of the cam slot 29b in the blade 20d2. Herein, the directions of the pressing forces F and F1 are substantially perpendicular to the singing direction D of the drive pin 42, whereby the drive pin 42 dose not escape from the restricting area R2 and R4 and remains in the restricting area R2 and R4. Thus, even when an external force is exerted to swing the blades 20d1 and 20d2 counterclockwise, swinging thereof is restricted. Further, the blade 20d3 and the small aperture blade 20d4 are restricted from swinging. Accordingly, even in a case where the plural blades are employed, the plural blades can be securely prevented from being displaced, and the shooting image can be prevented from being adversely affected.

As described above, according to the blade drive device 1d in the fully opened state, the cam slot 29b of the blade 20d2 and the cam slot 29a of the support blade 20d1 are configured such that the drive pin 42 remains in the restricting area R2, serving as the first restricting area, and in the restricting area R4, serving as the second restricting area, so the blade 20d2 and the support blade 20d1 are restricted from swinging. That is, when the drive pin 42 is located in the first restricting area R2 of the cam slot 29b of the blade 20d2, the cam slot 29a of the support blade 20d1 is configured such that the drive pin 42 engages the second restricting area R4. With these arrangements, for example, when the blade 20d2 and the support blade 20d1 are employed to cover a comparatively large shutter opening, providing that cam slots, which simultaneously restricts the blade 20d2 and the support blade 20d1 from swinging, are respectively provided in the blade 20d2 and the support blade 20d1, the plural blades can be securely restricted from swinging.

Next, a description will be given of the blade drive device 1d in the small aperture state with reference to FIGS. 17, 19A and 19B. As described above, the support blade 20d3 and the small aperture blade 20d4 are swingably supported by the identical fixed spindle 53c, whereas the blade 20d3 is restricted from swinging counterclockwise in the small aperture position by abutting the end portions thereof with the restriction pin 55b. Further, the small aperture blade 20d4 is restricted from swinging clockwise by the restriction pin 55c. Herein, when an external force which is caused by a factor other than the drive pin 42 is exerted to swing the blade 20d3 clockwise, the pressing force F is applied to the drive pin 42 by an edge portion 29c1 in the restricting area R4 of the cam slot 29c of the support blade 20d3. Here, the direction of the pressing force F is substantially perpendicular to the singing direction D of the drive pin 42, whereby the drive pin 42 does not escape from the restricting area R4 and remains in the restricting area R4. Therefore, even when an external force is exerted to swing the support blade 20d3 clockwise, such a swinging is restricted. The blades 20d1 and 20d2, and the small aperture blade 20d4 also are restricted from swinging. Accordingly, even when the plural blades are employed, these plural blades can be securely prevented from being displaced and the shooting image can be prevented from being adversely affected.

Further, as described above, in the blade drive device 1d having the plural blades allowing the shutter opening 11 to maintain any one of the fully opened state, the fully closed state, and the small aperture state, the drive pin 42 engages the restricting area 4R of the cam slot 29c of the support blade 20d3 in the small aperture state where the small aperture opening 21d enters the shutter opening 11. When an external force is applied to the support blade 20d3 at this time, the support blade 20d3 is restricted from moving with respect to the board, the blades 20d1 and 20d2, and the small aperture blade 20d4 are restricted from swinging. This securely prevents the plural blades from being displaced, securely prevents the small aperture blade 20d4 from being displaced even when a restricting area of the cam slot 29d is not provided therein, and prevents the shooting image from being adversely affected.

The present invention is not limited to the above-mentioned embodiment, and other embodiments, variations and modifications may be made without departing from the scope of the present invention.

In the first embodiment, the blade 20 is restricted from swinging when positioned to overlap the shutter opening 11. However, the present invention is not limited to this configuration. For example, the blade 20 may be restricted from swinging when positioned to recede from the shutter opening 11. In addition, the present invention is not limited to the single blade employed in this embodiment, and may employ a blade drive device having plural blades. In this case, the present invention may be applied to all or one of the blades.

In the first, second, and third embodiments, the present invention may employ the blade for bringing the shutter opening 11 formed on the board into the fully closed state. Further, in the second embodiment, the present invention may employ the blade 20a with an ND filter attached thereto.

The third embodiment exemplifies the configurations such that the blade 20 is provided with the first restricting area R2 and the support blade 20c is provide with the second restricting area R4 when the blade 20b is located in the receded position and the overlapped position, that is, when the shutter opening 11 is located in the fully opened state and the fully closed state. However, in a blade drive device capable of bringing the shutter opening 11 into any one of the fully opened state, the fully closed state, and the small aperture state, the present invention may be applied to two states of both ends thereof.

The fourth embodiment exemplifies the blade drive device capable of holding the shutter opening 11 in any one of the fully opened state, the fully closed state, and the small aperture state, by means of the blades 20c1 and 20c2, and the small aperture blade 20c3 having the small aperture opening 21c with a diameter smaller than that of the shutter opening 11. However, the present invention may be applied to a blade drive device in which the shutter opening 11 is retained in any one of a first small aperture state, a fully closed state, and a second small aperture state, by means of first and second small aperture blades respectively having small aperture openings with diameters smaller than that of the shutter opening 11.

Finally, several aspects of the present invention are summarized as follows.

According to an aspect of the present invention, there is provided a blade drive device including: a board having a shutter opening; a blade for adjusting an amount of light entering the shutter opening; and a transmitting member for transmitting a drive force to the blade. The transmitting member includes a drive pin swinging about a given support point, the blade has a first cam slot engaged with the drive pin and swinging about a given support point in conjunction with a swinging of the drive pin, the first cam slot includes a first permitting area and a first restricting area, the blade is permitted to swing when the drive pin is located in the first permitting area, the blade is restricted from swinging when the drive pin is located in the first restricting area.

Therefore, when an external force is applied to the blade when the drive pin is located in the first restricting area, the blade is restricted from being displaced with respect to the board. This prevents the blade from being displaced and the shooting image form being adversely affected.

In the above configuration, when the drive pin is located in the first restricting area and swings, the drive pin may escape from the first restricting area, and when the drive pin is located in the first restricting area and an external force, which is caused by a factor other than the drive pin, is applied to the blade, the drive pin may be maintained in the first restricting area.

Therefore, when an external force is applied to the blade when the drive pin is located in the first restricting area, the blade can be restricted from moving and being displaced with respect to the board and the shooting image can be prevented form being adversely affected.

In the above configuration, the first cam slot may be formed into a letter L shape such that the first permitting area and the first restricting area are substantially perpendicular to each other.

In the above configuration, the blade may swing such that the first cam slot passes between supporting points of the drive pin and the blade.

In the above configuration, the first cam slot may have the first restricting area at its both ends, and may be formed into a letter S shape such that the first permitting area and the first restricting area are substantially perpendicular to each other.

With such a configuration, when an external force is applied to the blade and the drive pin is located in any one of two restricting areas formed at both end portions of the first cam slot, the blade is restricted from moving with respect to the board. Accordingly, in the two states in association with the positions of the blade of the blade drive device, the blade can be prevented from being displaced and the shooting image can be prevented from being adversely affected.

In the above configuration, the blade drive device may further include a support blade swingably supported by an identical spindle supporting the blade, the support blade and the blade cooperatively may adjust the amount of light entering the shutter opening, the support blade may have a second cam slot engaging the drive pin, the second cam slot may include a second permitting area and a second restricting area, the drive pin may engage the first restricting area of the first cam slot when the drive pin swings to reach one end of the second cam slot, and the drive pin may engage the second restricting area of the second cam slot when the drive pin swings to reach the other end of the second cam slot.

With such a arrangement, since the drive pin engages the restricting area in each cam slot of the blade and the support blade in the end of the swinging range of the drive pin, even when a cam slot of a single blade is not provided respectively with the restricting areas at its both ends because of space limitations or the like, the blade can be prevented form being displaced when an external force is applied thereto, and the shooting image can be prevented from being adversely affected.

In the above configuration, the blade may include a plurality of blades swingably supported by different spindles of the board, respectively; at least one of the plurality of blades may have a small aperture opening smaller than the shutter opening in diameter; and the plurality of blades may make the shutter opening be in any one of a fully opened state, a fully closed state, and a small aperture state, to adjust the amount of entering light, in response to the swinging of the drive pin.

Therefore, in the blade drive device having the plural blades keeping the shutter opening any one of the fully opened state, the fully closed state, and the small aperture state, when an external force is applied to the blade and the drive pin is located in the restricting area of the cam slot in the blade, the blade is restricted form being displaced with respect to the board. Accordingly, even when the plural blades are employed, the blades can be prevented from being displaced, and the image can be prevented from being adversely affected.

In the above configuration, the blade drive device may further include at least single support blade swingably supported by an identical spindle supporting the blade having the small aperture opening, the support blade may have a second cam slot engaging the drive pin, the second cam slot may include a second permitting area and a second restricting area, and the drive pin may engage the second restricting area of the second cam slot when the small aperture opening moves into the shutter opening to form the small aperture state.

With such a configuration, in the small aperture state of the blade drive device having the plural blades maintaining the shutter opening in any one of the fully opened state, the fully closed state, and the small aperture state, when an external force is applied to the support blade and the drive pin is located in the restricting area of the cam slot in the support blade, the support blade can be prevented from moving with respect to the board. Accordingly, even when the cam slot of the small aperture blade is not provided with the restricting area, the small aperture blade can be prevented from being displaced, and the image can be prevented from being adversely affected.

In the above configuration, the blade drive device may further comprising a support blade swingably supported by a different spindle that is a spindle supporting the blade, the support blade and the blade may move from an identical side to cooperatively cover the shutter opening to adjust the amount of light entering the shutter opening, the support blade may have a second cam slot engaging the drive pin, the second cam slot may include a second permitting area and a second restricting area, and the drive pin may engage the second restricting area of the second cam slot when the drive pin is engaged in the first restricting area of the first cam slot.

With such an arrangement, in the blade drive device in which the plural blades cover the shutter opening, when an external force is applied to the blade and the drive pin is located in the restricting area, the restricting area of each cam slot suppresses the blade from moving with respect to the board. This securely prevents the blade from being displaced and the shooting image from being adversely affected.

What is claimed is:

1. A blade drive device comprising:
   a board having a shutter opening;
   a blade for adjusting an amount of light entering the shutter opening; and
   a transmitting member for transmitting a drive force to the blade, wherein:
   the transmitting member includes a drive pin swinging about a given support point;
   the blade has a first cam slot engaged with the drive pin and the blade swings in a rotating manner about a given support point in response to a swinging of the drive pin;
   the first cam slot includes a first permitting area and a first restricting area;
   the blade is permitted to swing about the given support point when the drive pin is located in the first permitting area; and
   the blade is restricted from swinging about the given support point when the drive pin is located in the first restricting area, wherein:
   when the drive pin is located in the first restricting area and swings, the drive pin escapes from the first restricting area; and
   when the drive pin is located in the first restricting area and an external force is applied to the blade, the drive pin is maintained in the first restricting area.

2. The blade drive device of claim 1, wherein the first cam slot is formed into a letter L shape such that the first permitting area and the first restricting area are substantially perpendicular to each other.

3. The blade drive device of claim 1, wherein the blade swings such that the first cam slot passes between supporting points of the drive pin and the blade.

4. The blade drive device of claim 1, wherein the first cam slot has the first restricting area at its both ends, and is formed into a letter S shape such that the first permitting area and the first restricting area are substantially perpendicular to each other.

5. The blade drive device of claim 1, further comprising a support blade swingably supported by an identical spindle supporting the blade, the support blade and the blade cooperatively adjust the amount of light entering the shutter opening, wherein:
   the support blade has a second cam slot engaging the drive pin;
   the second cam slot includes a second permitting area and a second restricting area;
   the drive pin engages the first restricting area of the first cam slot when the drive pin swings to reach one end of the second cam slot; and
   the drive pin engages the second restricting area of the second cam slot when the drive pin swings to reach the other end of the second cam slot.

6. The blade drive device of claim 1, wherein:
   the blade includes a plurality of blades swingably supported by different spindles of the board, respectively;
   at least one of the plurality of blades has a small aperture opening smaller than the shutter opening in diameter; and
   the plurality of blades make the shutter opening be in any one of a fully opened state, a fully closed state, and a small aperture state, to adjust the amount of entering light, in response to the swinging of the drive pin.

7. The blade drive device of claim 6, further comprising at least single support blade swingably supported by an identical spindle supporting the blade having the small aperture opening, wherein:
   the support blade hasp a second cam slot engaging the drive pin;
   the second cam slot includes a second permitting area and a second restricting area; and
   the drive pin engages the second restricting area of the second cam slot when the small aperture opening moves into the shutter opening to form the small aperture state.

8. The blade drive device of claim 1, further comprising a support blade swingably supported by a different spindle that is a spindle supporting the blade, the support blade and the blade moving from an identical side to cooperatively cover the shutter opening to adjust the amount of light entering the shutter opening, wherein:
   the support blade has a second cam slot engaging the drive pin;
   the second cam slot includes a second permitting area and a second restricting area; and
   the drive pin engages the second restricting area of the second cam slot when the drive pin is engaged in the first restricting area of the first cam slot.

* * * * *